United States Patent [19]

Morikawa et al.

[11] Patent Number: 4,996,915
[45] Date of Patent: Mar. 5, 1991

[54] APPARATUS FOR PRODUCING A DOUGH ROLL

[75] Inventors: Michio Morikawa; Toru Watanabe, both of Tochigi, Japan

[73] Assignee: Rheon Automatic Machinery Co., Ltd., Utsunomiya, Japan

[21] Appl. No.: 443,977

[22] Filed: Nov. 30, 1989

[30] Foreign Application Priority Data

Dec. 3, 1988 [JP] Japan .......................... 63-157764[U]
Dec. 5, 1988 [JP] Japan .......................... 63-158273[U]

[51] Int. Cl.$^5$ .......................... A21C 3/06; A21C 11/00; A23P 1/00
[52] U.S. Cl. .................. 99/450.2; 99/450.1; 99/353; 425/321; 425/335
[58] Field of Search .............. 99/450.1, 450.2, 450.8, 99/450.7, 483, 516, 352, 353, 355, 356; 426/502, 512, 503, 500, 518; 425/321, 322, 371, 374, 384, 363; 100/118, 151, 153

[56] References Cited

U.S. PATENT DOCUMENTS

| | | | |
|---|---|---|---|
| 2,450,033 | 9/1948 | Cohen | 99/450.1 |
| 2,746,401 | 5/1956 | Archer | 425/321 |
| 3,704,664 | 12/1972 | Fisher, Jr. | 99/450.2 |
| 3,993,422 | 11/1976 | Riviere et al. | 425/321 |
| 4,171,197 | 10/1976 | Sato | 99/353 |
| 4,313,719 | 2/1982 | Lundgren | 99/353 |
| 4,389,176 | 6/1983 | Nenci | 425/321 |
| 4,678,418 | 7/1987 | Thulin | 99/450.2 |
| 4,741,263 | 5/1988 | Ueno et al. | 425/335 |
| 4,767,638 | 8/1988 | Uhrovic | 426/512 |

Primary Examiner—Timothy F. Simone
Attorney, Agent, or Firm—Guy W. Shoup; Paul J. Winters

[57] ABSTRACT

An apparatus for producing a dough roll is provided, in which a dough piece is held between the conveying path of a conveyor and the parallel and spaced-apart projections extending along the conveying direction, or held between the similar projections of a conveyor and the lower surface of a belt or roller system, while being moved downstream, passes between a pair of vertically juxtaposed rollers to be uniformly stretched without any lateral deformation of the rear portion of the dough piece due to irregularly gathered gases therein, and a symmetrically formed dough roll is produced.

22 Claims, 8 Drawing Sheets

APPARATUS FOR PRODUCING A DOUGH ROLL

BACKGROUND OF THE INVENTION

1. Field of the Invention

This invention relates to an apparatus for producing a dough roll in which a dough roll is first stretched by a pair of vertically juxtaposed rollers and then rolled up by a dough piece rolling up mechanism to shape the rolled dough into, for example, a croissant or butter roll. In this industrial field exactly and properly rolled and shaped dough rolls are required to reduce the production costs, because a dough piece that is deformed when it passes between the juxtaposed rollers is discarded as an inferior-quality product, thereby increasing production costs.

2. Description of Prior Art

In producing croissants or butter rolls there has been a problem in improperly forming shaped dough rolls due to the deviation of the center line of a dough piece from the direction of the advancing conveyor by which the dough piece is conveyed. To eliminate the deviation, there has been provided a pair of vertically juxtaposed rollers arranged upstream of a dough piece rolling up mechanism, where the peripheral speeds of the pair of rollers are slower than the conveying speed of the inlet conveyor of the rolling up mechanism, so that the leading end of the dough piece slips on the conveying path of the inlet conveyor, while the rear portion of the dough piece is held between the pair of rollers, whereby the center line of the dough piece is caused to be parallel to the direction of the advancing conveyor. This pair of rollers functions to simultaneously stretch the dough piece to the desired thickness before it enters the rolling up mechanism. However, there has been a phenomenon whereby gases in the dough piece are moved rearwardly by the pair of rollers when they squeeze the dough piece and are irregularly gathered at the trailing end of the dough piece, whereby the rear portion of the dough piece is laterally bent and deformed, when it passes the pair of rollers. Such a deformed dough piece permits the formation of an unsymmetrically rolled croissant dough or butter roll dough.

SUMMARY OF THE INVENTION

It is therefore an object of this invention to eliminate the defect of the apparatus of the prior art and to provide an apparatus by which the deviation of the center line of a dough piece when it passes between the pair of rollers is eliminated.

Another object of this invention is to provide an apparatus for producing a dough roll that is exactly and properly rolled.

It is a further object of this invention to provide an apparatus by which a dough piece is symmetrically rolled, thereby eliminating any deformed dough rolls.

In one aspect of this invention an apparatus for producing a dough roll is provided that comprises a conveyor having a peripheral orbit that includes a conveying path, a pair of vertically juxtaposed rollers comprising an upper roller and a lower roller arranged downstream of said conveyor, for stretching a dough piece, and a rolling up mechanism arranged downstream of said pair of rollers for rolling up the dough piece, characterized in that a dough piece holding means is arranged adjacent and upstream of said pair of rollers and positioned above said conveyor to prevent the lateral deformation of the rear portion of the dough piece when it passes between said pair of rollers, said holding means comprising a plurality of projections extending parallel to each other and along the advancing direction of the dough piece on said conveyor, while contacting the upper surface of said dough piece, said plurality of projections being movable in the advancing direction of the dough piece in synchronization with the movement of said conveyor.

In another aspect of this invention an apparatus for producing a dough roll is provided that comprises a conveyor having a peripheral orbit that includes a conveying path, a pair of vertically juxtaposed rollers comprising an upper roller and a lower roller arranged downstream of said conveyor, for stretching a dough piece, and a rolling up mechanism arranged downstream of said pair of rollers for rolling up the dough piece, characterized in that said conveyor has a plurality of projections extending parallel to each other and along the advancing direction of the dough piece on said conveyor, and a dough piece holding means is arranged above said conveyor and has a lower surface contacting the upper surface of the dough piece, said lower surface being movable in the advancing direction of the dough piece in synchronization with the movement of said conveyor.

In still another aspect of this invention an apparatus for producing a dough roll is provided that comprises a conveyor having a peripheral orbit that includes a conveying path for conveying a dough piece; a dough piece holding and stretching means comprising a pair of vertically juxtaposed rollers comprising an upper roller and a lower roller arranged downstream of said conveyor, said upper roller of said pair of rollers being provided with a plurality of parallel and spaced-apart annular grooves on the periphery thereof, at least one laterally extending roller arranged above said conveyor, and a plurality of parallel and spaced-apart belts entrained over said plurality of grooves of said upper roller and said at least one roller, said plurality of belts, while contacting the upper surface of said dough piece, being movable in the advancing direction of the dough piece in synchronization with the movement of said conveyor; and a rolling up mechanism arranged downstream of said pair of rollers for rolling up the dough piece.

In a still further aspect of this invention an apparatus for producing a dough roll is provided that comprises a dough piece conveying and stretching means comprising a pair of vertically juxtaposed rollers comprising an upper roller and a lower roller, said lower roller of said pair of rollers being provided with a plurality of parallel and spaced-apart annular grooves on the periphery thereof, at least one laterally extending roller arranged upstream of said pair of rollers, and a plurality of parallel and spaced-apart belts entrained over said plurality of grooves and said at least one roller to form a conveying path for a dough piece; a dough piece holding means arranged above said conveying path and having a lower surface contacting the upper surface of said dough piece, said lower surface being movable in the advancing direction of the dough piece in synchronization with the movement of said conveying and stretching means; and a rolling up mechanism arranged downstream of said pair of rollers for rolling up the dough piece.

In this invention the dough piece is advanced while being held between the conveying path and a plurality of parallel and spaced-apart projections extending along the conveying direction of the dough piece, the projections being movable in synchronization with the movement of the conveyor. These projections constitute a dough piece holding means, or constitute a dough piece holding and stretching means. This holding and stretching means can hold and then stretch the dough piece.

When these projections are used for conveying the dough piece, a belt or roller system having a lower surface, that moves in synchronization with the movement of the projections, functions as a dough piece holding means. These projections therefore function as a conveyor, or may function as a dough piece conveying and stretching means. This conveying and stretching means can convey and then stretch the dough piece.

The dough piece, either held between the conveying path and the holding means or held between the projections that function to convey the dough piece and the belt or roller system, can pass between the pair of rollers without the center line of the dough piece deviating, so that the lateral deformation of its rear portion is prevented.

The projections of this invention can be arranged to face upwardly in opposing the lower surface of the belt or roller system, or to face downwardly in opposing the upper surface of the conveyor. Also, two sets of projections may be arranged so as to face each other so that the dough piece advances between the two sets of projections.

PREFERRED EMBODIMENTS OF THE INVENTION

The first embodiment of this invention will now be described by reference to the drawings.

Figure 1:
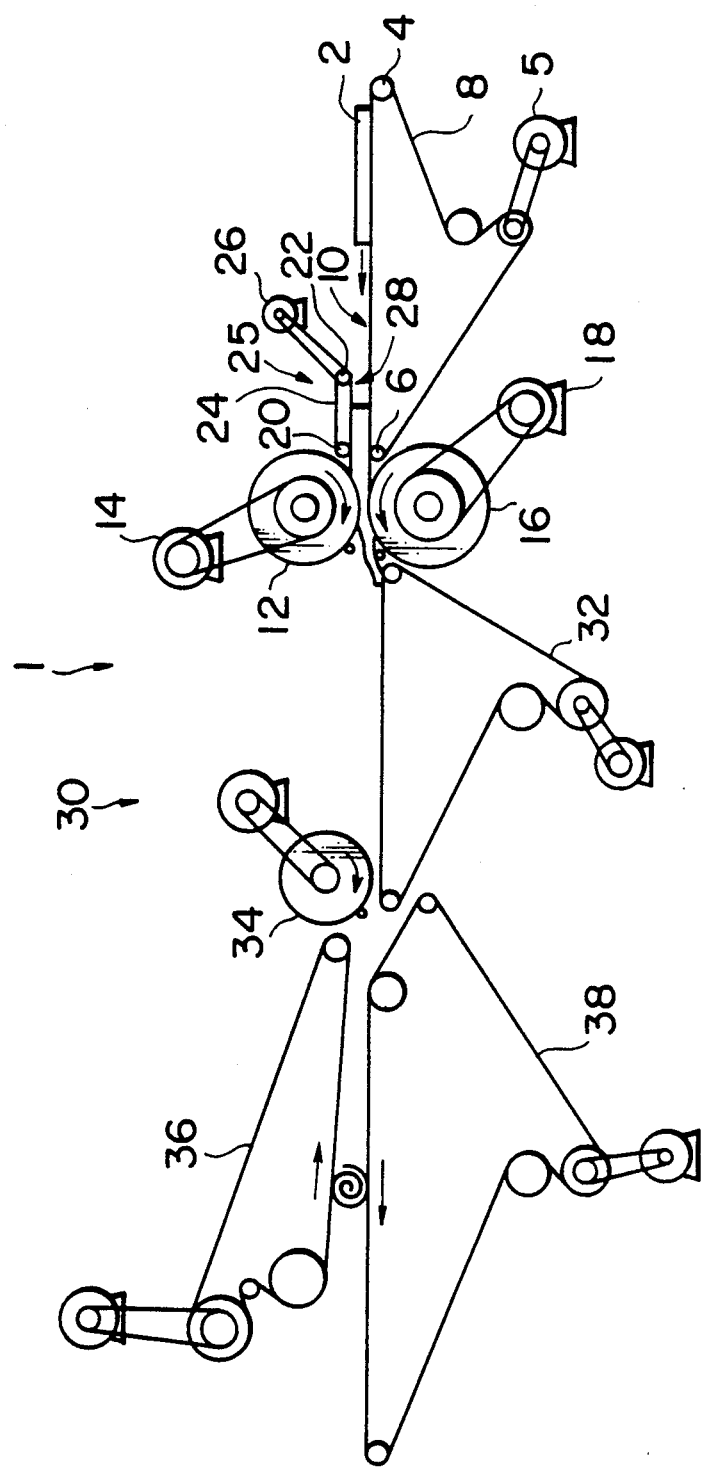
FIG. 1 is a schematic elevational view showing the apparatus for producing a dough roll of a first embodiment of this invention.
Figure 2:
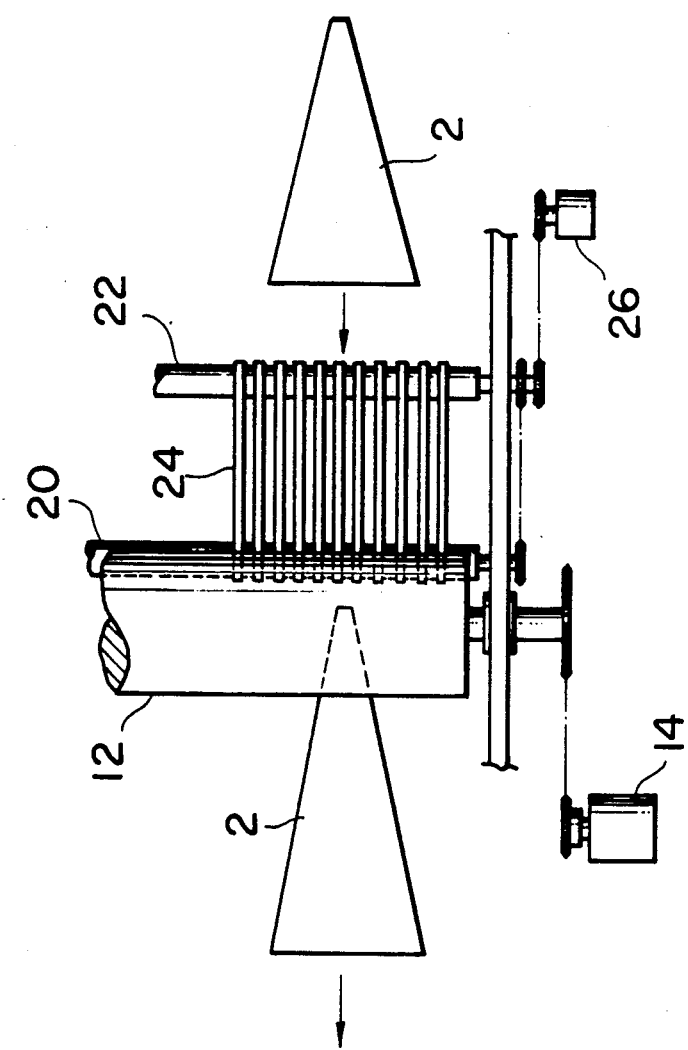
FIG. 2 is a schematic plane view showing part of the dough piece holding means of the first embodiment.

In FIGS. 1 and 2 an apparatus 1 for producing a dough roll of the first embodiment of this invention is shown. A belt conveyor 8 driven by a motor 5 has a conveying path 10 and includes rollers 4 and 6. A pair of vertically juxtaposed rollers comprising an upper roller 12 driven by a motor 14 and a lower roller 16 driven by a motor 18 are shown. A dough piece holding means 25 is arranged adjacent and upstream of the pair of rollers and positioned above the conveyor 8, which means comprises rollers 20 and 22, and a plurality of parallel and spaced-apart belts 24 is entrained over the rollers 20 and 22, and it has a lower surface 28. The lower surface 28 of the holding means can advance by a motor 26 in synchronization with, and at the same speed as, the movement of the conveying path 10 of the conveyor 8. A dough piece rolling up mechanism 30, as disclosed in U.S. Pat. No. 07/407,844, filed Sept. 15, 1989, by the applicant, is arranged downstream of the pair of rollers, which mechanism 30 comprises a roller 34, conveyors 32 and 38, and a belt device 36.

Figure 3:
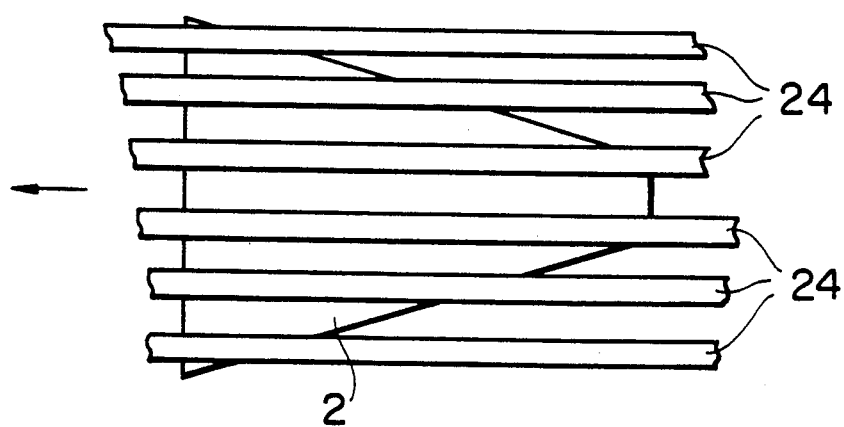
FIG. 3 is a schematic plane view showing the relationship between the belts that constitute the projections and a dough piece, in the first embodiment.
Figure 4:
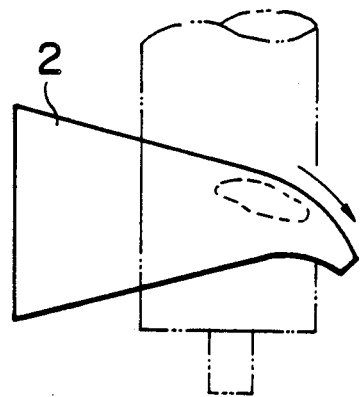
FIG. 4 is a schematic plane view showing the deformation of the trailing end of a dough piece that is due to the irregularly gathered gases, in an apparatus of the prior art.
Figure 5:
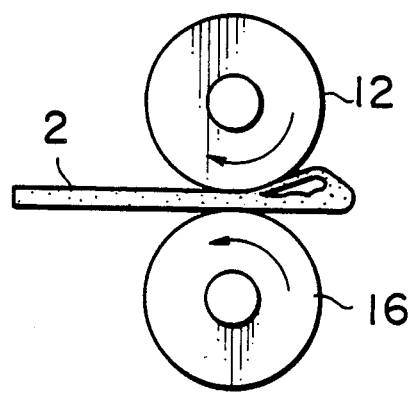
FIG. 5 is a schematic side elevational view, partly in section, showing the pair of rollers and a dough piece that includes gases at its trailing end, in an apparatus of the prior art.

A dough piece 2 on the conveying path 10 is conveyed and then held between the lower surface 28 of the holding means 25 and the conveying path 10, while being moved together with the lower surface 28 and the conveying path 10 of the conveyor 8, and enters between the pair of rollers 12 and 16. The dough piece 2 is suitably pressed against the conveying path 10 by the plurality of belts 24, namely, the projections of this invention, and the center line of the dough piece 2 is kept parallel to the advancing direction of the conveyor 8, as shown in FIG. 3, because the frictional engagement of the projections with the upper surface of the dough piece prevents the trailing portion of the dough piece from being laterally moved. If the holding means 24 of this invention is not present, the trailing end of the dough piece 2 may be deformed, since gases in the dough piece are compelled to move rearward and gather at the trailing portion and form irregularly formed pores as shown by dotted lines in the dough piece 2 in FIG. 4. They result in an unequally stretched trailing portion of the dough piece. These gases are squeezed by the rollers 12 and 16 as shown in FIG. 5. The dough piece 2 passed between the rollers 12 and 16 is then fed to the dough piece rolling up mechanism 30 and rolled up by the belt device 36 and belt conveyor 38, as shown in FIG. 1. The rolled dough has a symmetrical form. The peripheral speed of the rollers 12 and 16 are generally the same as the moving speeds of the lower surface 28 and the conveying path 10. If the peripheral speed of the rollers 12 and 16 is faster than the moving speeds of the lower surface 28 and the coveying path 10, the longitudinal length of the dough piece 2 will be somewhat extended, in comparison with the dough piece stretched in the aforesaid general condition, so that the winding number of dough rolls can be increased.

Figure 6:
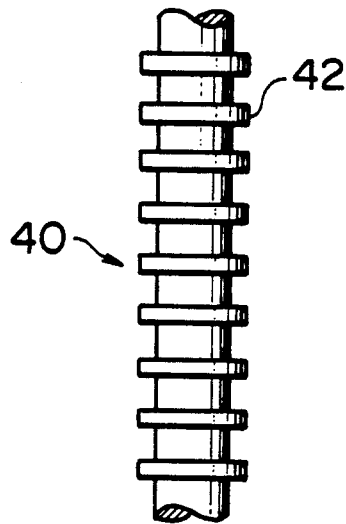
FIG. 6 is a plane view showing part of a roller provided with a plurality of parallel and spaced-apart annular projections of this invention.
Figure 7:
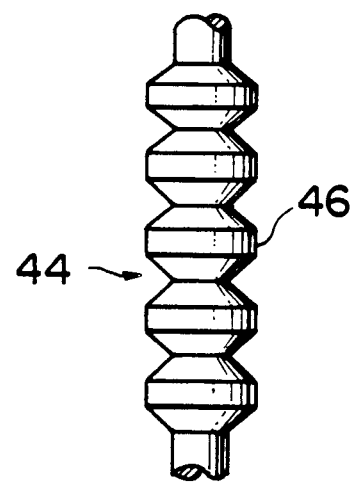
FIG. 7 is a plane view showing part of a roller provided with a plurality of parallel and spaced-apart annular projections of the holding means of a second embodiment of this invention.
Figure 8:
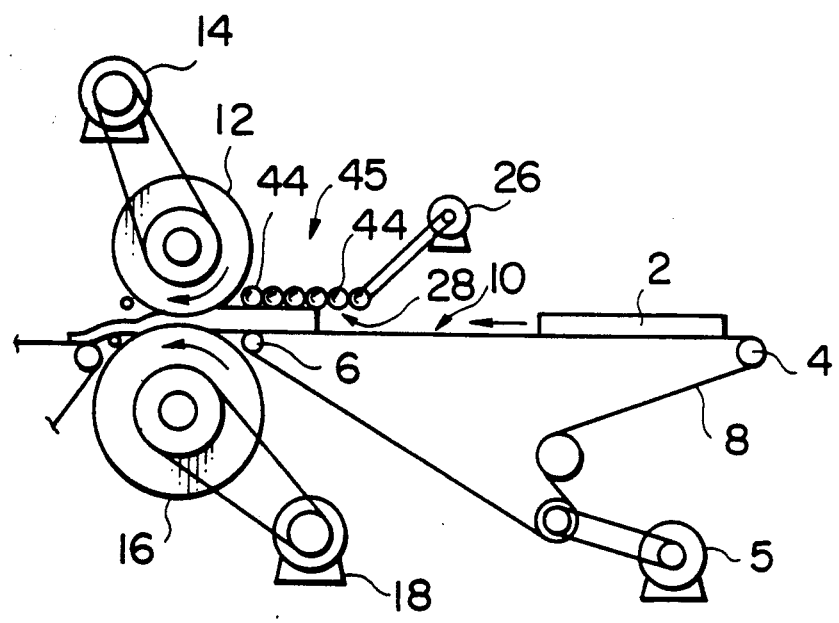
FIG. 8 is a schematic elevational view showing an apparatus for producing a dough roll according to the second embodiment of this invention.

In FIG. 8, showing the second embodiment of this invention, almost the entire rolling up mechanism is omitted. In this embodiment a plurality of rollers 44, each being provided with a plurality of parallel and spaced-apart annular projections 46 as shown in FIG. 7, is used in place of the holding means 25 of the first embodiment. The plurality of rollers 44 are disposed to be juxtaposed, and they are arranged adjacent and upstream of the pair of rollers 12 and 16, and constitute a dough piece holding means 45, and it is driven by a motor 26. Each of the rollers 44 rotates at the same peripheral speed through sprockets and chains, arranged such that each of the sprockets is mounted to the shaft of each of the rollers 44, and the chains are entrained over the sprockets, (not shown) by the motor 26. The rollers 44 are aligned horizontally so that the bottom parts of the rollers form an imaginary straight line. For convenience sake, we will call this straight line the lower surface 28 of the rollers. The lower surface 28 presses the upper surface of the dough piece against the conveying path 10 of the conveyor 8. The surface 28 is moved in the conveying direction in synchronization with, and at the same speed as, the conveying speed of the conveyor 8. Thus, the dough piece 2 can be conveyed while being held between the conveying path 10 and the lower surface 28, and enters between the rollers 12 and 16. Since the dough piece 2 is held by the holding means 45, no lateral deformation of the trailing end of the dough piece occurs. A roller 40, as shown in FIG. 6, provided with a plurality of parallel and spaced-apart annular projections 42, can also be used for the holding means 45.

Figure 9:
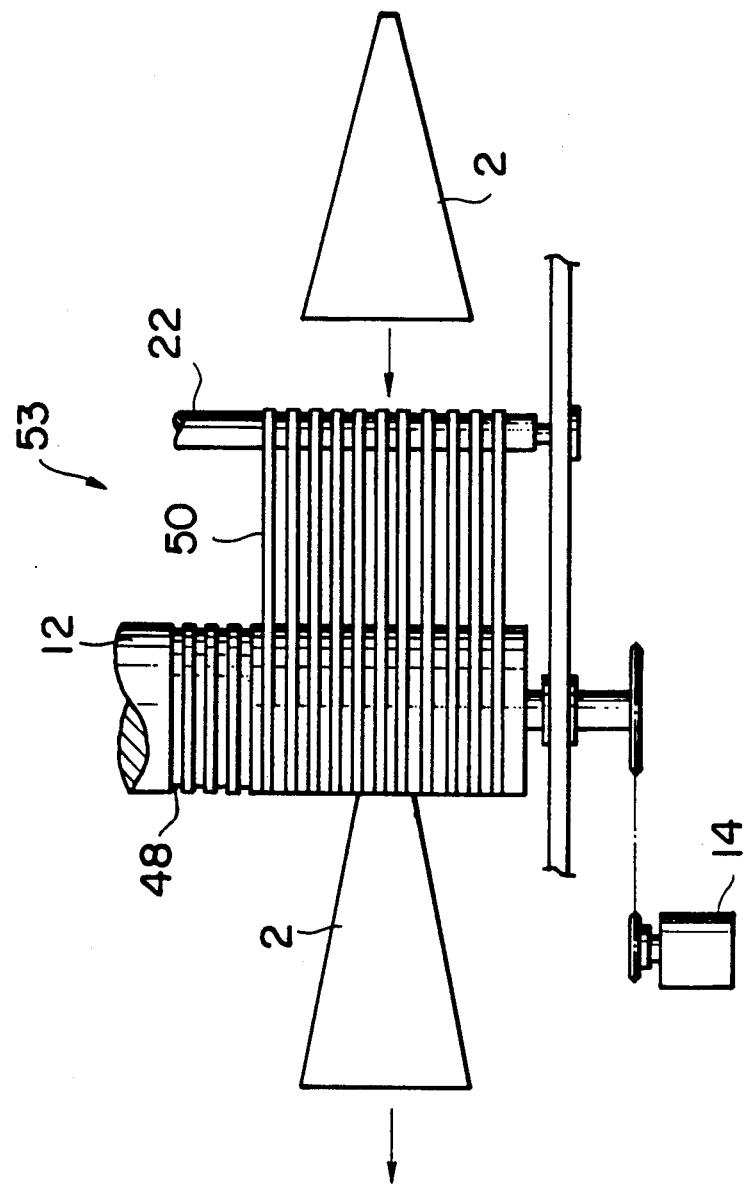
FIG. 9 is a schematic plane view showing a dough piece holding and stretching means according to a third embodiment of this invention.

FIG. 9 shows the dough piece holding and stretching means 53 of the third embodiment of this invention. On the periphery of a roller 12 a plurality of parallel and spaced-apart annular grooves 48 are provided, which grooves are shaped so that the belts 50 of a complementary cross-section are snugly entrained over the roller 12 so that the periphery of the roller 12 is uniform throughout the roller. Therefore, the means 53 can hold and stretch the dough piece 2, cooperatively with the lower roller 16 (not shown in FIG. 2), which is not provided with the parallel and spaced-apart annular grooves. Although the grooves 48 are so shaped that the belts 50 are snugly received and may provide a uniform surface on the certain portion of the roller 12, the grooves can be so shaped that the belts 50 may somewhat protrude from the surface of the rollers, or may be somewhat retracted from it, to stretch the dough piece between the pair of rollers. Although a dough piece for croissants of a triangular form is used in the embodiments, a dough piece for a butter roll of a square form, or any other form of dough piece, can be rolled up without deforming its predetermined shape.

In the above-mentioned embodiments 1, 2, and 3, the projections of the dough piece holding means, or the dough piece holding and stretching means, are positioned above the conveyor. However, the projections can be disposed such that the projections can act to convey the dough piece. In this case, for instance, two rollers, and a plurality of parallel and spaced-apart belts entrained over the two rollers, are arranged upstream of the pair of rollers in place of the belt conveyors used in the preceding embodiments, so that the entrained plural belts form a conveying path to convey the dough piece. For instance, above the thus formed conveying path, a belt system is arranged that comprises two rollers and a belt entrained over the two rollers, and the entrained belt includes a lower surface that can be moved in the conveying direction in synchronization with, and at the same speed as, the movement of the projections. A dough piece 2 is held between the lower surface of the belt system and the projections while being moved downstream and inserted between the pair of rollers. If the lower roller 16 is provided with a plurality of parallel and spaced-apart annular grooves on its periphery, and a plurality of parallel and spaced-apart belts is entrained over the grooves and a roller arranged upstream of the pair of rollers, the pair of rollers, the plurlity of belts entrained over the lower roller, and the roller, constitute a dough piece conveying and stretching means. Namely, the plurality of belts entrained over the lower roller and the roller arranged upstream of the lower roller, function to convey the dough piece, and the lower roller and the upper roller function to stretch the dough piece. In this case the aforementioned belt system is also arranged above the projections of the dough piece conveying and stretching means. Alternatively, a roller system may be used as a dough piece holding means in place of the belt system, which roller system comprises a plurality of juxtaposed rollers that are driven at the same peripheral speed and have a lower surface. The lower surface contacts the upper surface of the dough piece and presses the dough piece against the projections of the conveying and stretching means, so that the projections frictionally engage the dough piece to prevent the lateral deformation of its trailing end.

Figure 10:
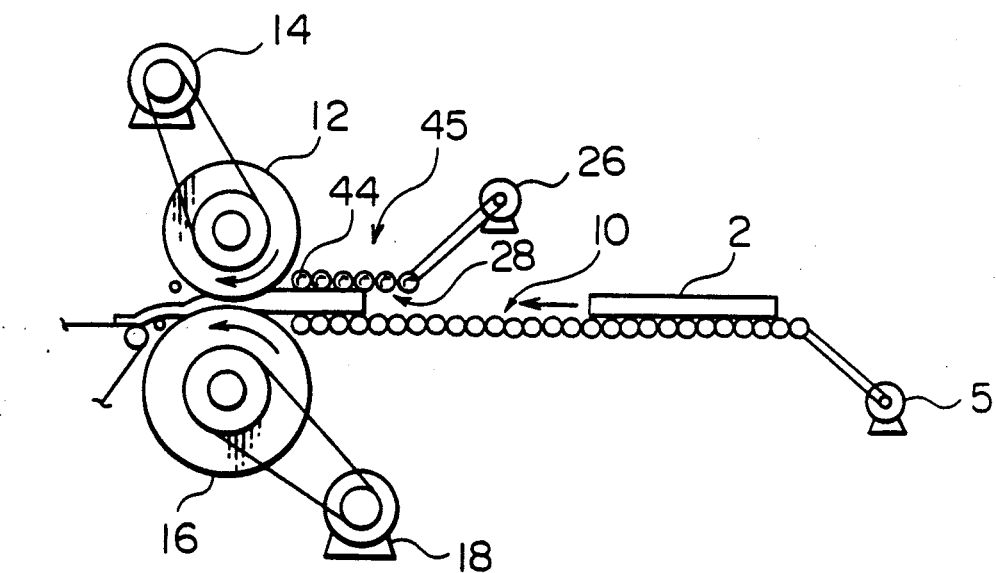
FIG. 10 is a schematic elevational view showing the apparatus for producing a dough roll according to a further embodiment of this invention.
Figure 11:
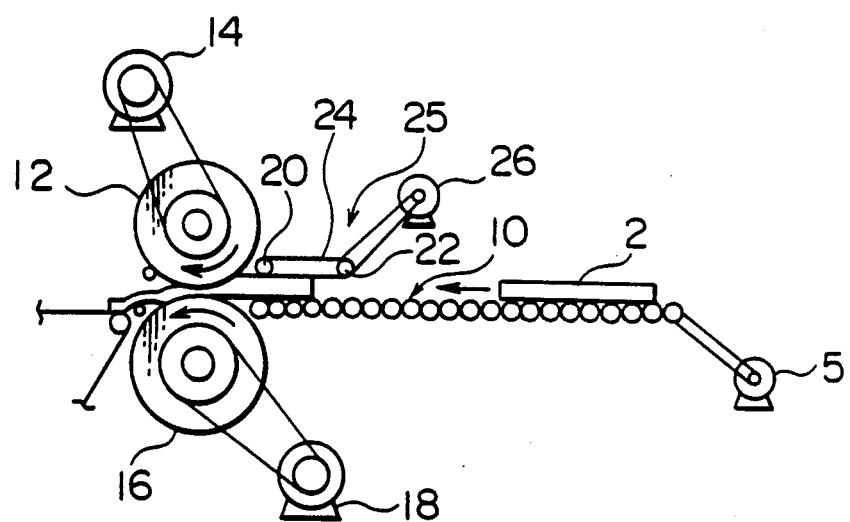
FIG. 11 is a schematic elevational view showing the apparatus for producing a dough roll according to still a further embodiment of this invention.
Figure 12:
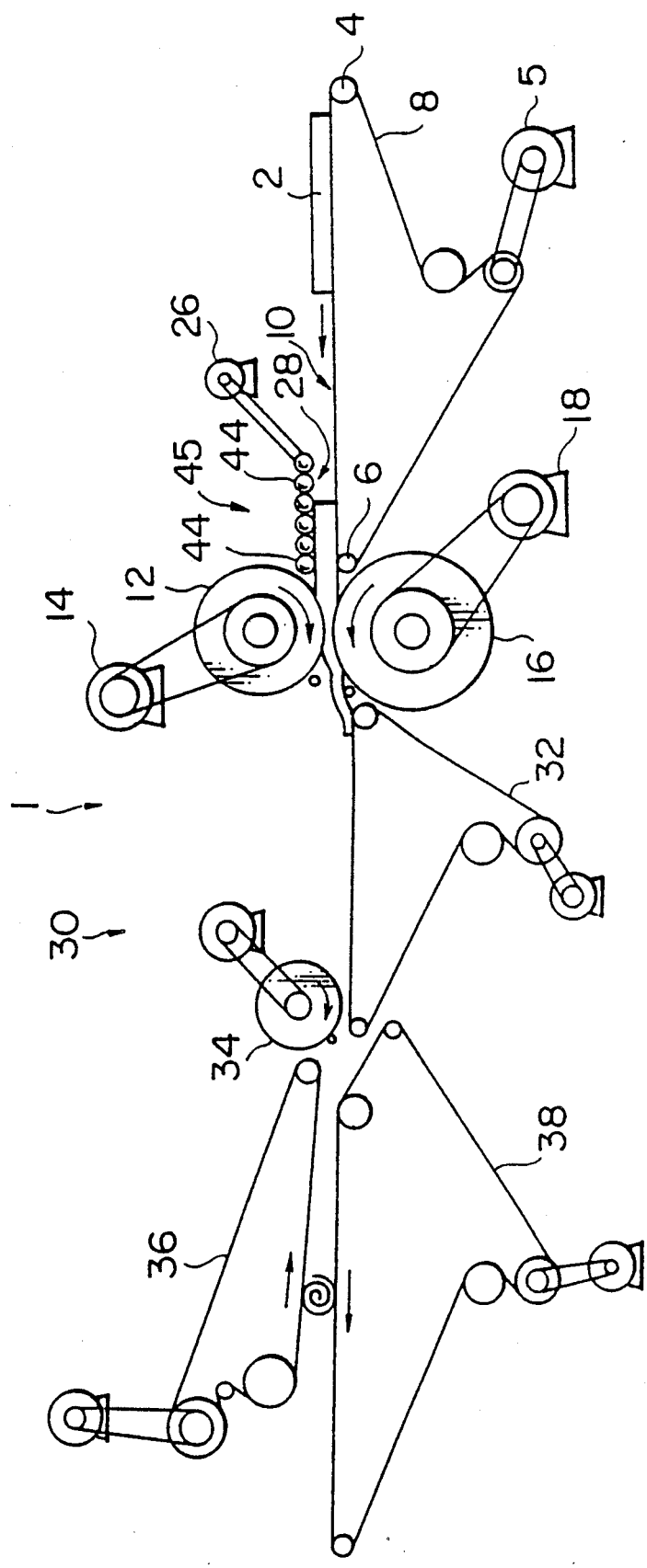
FIG. 12 is a schematic elevational view showing the apparatus for producing a dough roll according to a final embodiment of this invention.

FIG. 10 shows an embodiment of the apparatus for producing the dough roll, characterized in that the conveyor 10 comprises a plurality of rollers, and in that the holding means 45 is a roller system comprising a plurality of rollers 44 that are juxtaposed traversely of the conveying path. Fig. 11 shows another embodiment of the apparatus for producing the dough roll, characterized in that the conveyor 10 comprises a plurality of rollers, and in that the holding means 45 is a belt system comprising two laterally extending rollers 20 and 22 and a belt entrained over them. Finally, FIG. 12 shows a further embodiment of the apparatus for producing the dough roll having a dough piece rolling up mechanism 30, and characterized in that the holding means 45 is a roller system comprising a plurality of rollers 44 juxtaposed traversely of the conveying path.

As described above, the apparatus of this invention can prevent the dough piece from the lateral deviation, or the lateral deformation of the trailing or rear portion of the dough piece, when it passes between the vertically juxtaposed rollers, and the dough piece fed into the rolling up mechanism is properly rolled up, whereby symmetrically shaped dough rolls are produced without increasing producing costs. The apparatus of this invention can also be used to produce a dough roll from a dough piece of various forms other than triangular or square forms, and symmetrically rolled up bread dough will also result.

We claim:

1. An apparatus for producing a dough roll comprising a conveyor having a peripheral orbit that includes a conveying path, a pair of vertically juxtaposed rollers comprising an upper roller and a lower roller arranged downstream of said conveyor, for stretching a dough piece, and a rolling up mechanism arranged downstream of said pair of rollers for rolling up the dough piece, characterized in that a dough piece holding means is arranged adjacent and upstream of said pair of rollers and positioned above said conveyor to prevent the lateral deformation of the rear portion of the dough piece when it passes between said pair of rollers, said holding means comprising a plurality of projections extending parallel to each other and along the advancing direction of the dough piece on said conveyor, while contacting the upper surface of said dough piece, said plurality of projections being movable in the advancing direction of the dough piece in synchronization with the movement of said conveyor.

2. The apparatus of claim 1,
characterized in that
said conveyor is a belt conveyor, and said plurality of projections of said holding means consists of a plurality of parallel and spaced-apart belts entrained over at least two laterally extending rollers.

3. The apparatus of claim 2,
characterized in that
said belt conveyor comprises at least two laterally extending rollers and a plurality of parallel and spaced-apart belts entrained over said at least two rollers.

4. The apparatus of claim 1,
characterized in that
said conveyor is a roller conveyor, and said plurality of projections of said holding means consists of a plurality of parallel and spaced-apart belts entrained over at least two laterally extending rollers.

5. The apparatus of claim 1,
characterized in that
said conveyor comprises a plurality of rollers extending transversely of the conveying direction, each being rotatable and provided with a plurality of parallel and spaced-apart annular projections on the periphery thereof, and said plurality of projections of said holding means consists of a plurality of parallel and spaced-apart belts entrained over at least two laterally extending rollers.

6. The apparatus of claim 1,
characterized in that
said conveyor is a belt conveyor, and said plurality of projections of said holding means consists of a plurality of rollers juxtaposed transversely of the conveying direction, each being rotatable and provided with a plurality of parallel and spaced-apart annular projections.

7. The apparatus of claim 6,
characterized in that
said belt conveyor comprises at least two rollers and a plurarity of parallel and spaced-apart belts entrained over said at least two rollers.

8. The apparatus of claim 1,
characterized in that
said conveyor is a roller conveyor, and said plurality of projections of said holding means consists of a plurality of rollers juxtaposed transversely of the conveying direction, each being rotatable and provided with a plurality of parallel and spaced-apart annular projections.

9. The apparatus of claim 1,
characterized in that
said conveyor comprises a plurality of rollers juxtaposed transversely of the conveying direction, each being rotatable and provided with a plurality of parallel and spaced-apart annular projections, and said plurality of projections of said holding means consists of a plurality of rollers juxtaposed transversely of the conveying direction, each being rotatable and provided with a plurality of parallel and spaced-apart annular projections.

10. An apparatus for producing a dough roll comprising a conveyor having a peripheral orbit including a conveying path, a pair of vertically juxtaposed rollers comprising an upper roller and a lower roller arranged downstream of said conveyor, for stretching a dough piece, and a rolling up mechanism arranged downstream of said pair of rollers for rolling up the dough piece,
characterized in that
said conveyor has a plurality of projections extending parallel to each other and along the advancing direction of the dough piece on said conveyor, and a dough piece holding means is arranged above said conveyor and has a lower surface contacting the upper surface of the dough piece, said lower surface being movable in the advancing direction of the dough piece in synchronization with the movement of said conveyor.

11. The apparatus of claim 10,
characterized in that
said conveyor comprises at least two laterally extending rollers and a plurality of parallel and spaced-apart belts entrained over said at least two rollers, and said holding means is a belt system comprising at least two laterally extending rollers and a belt entrained over said at least two rollers.

12. The apparatus of claim 10,
characterized in that
said conveyor comprises a plurality of rollers juxtaposed transversely of the conveying direction, each being rotatable and provided with a plurality of parallel and spaced-apart annular projections, and said holding means is a belt system comprising at least two laterally extending rollers and a belt entrained over said at least two rollers.

13. The apparatus of claim 10,
characterized in that
said conveyor comprises at least two laterally extending rollers and a plurality of parallel and spaced-apart belts entrained over said at least two rollers, and said holding means is a roller system comprising a plurality of rollers juxtaposed transversely of the conveying path.

14. The apparatus of claim 10,
characterized in that
said conveyor comprises a plurality of rollers juxtaposed transversely of the conveying direction, each being rotatable and provided with a plurality of parallel and spaced-apart annular projections, and said holding means is a roller system comprising a plurality of rollers juxtaposed transversely of the conveying path.

15. An apparatus for producing a dough roll comprising a conveyor having a peripheral orbit including a conveying path for conveying a dough piece;
a dough piece holding and stretching means comprising a pair of vertically juxtaposed rollers comprising an upper roller and a lower roller arranged downstream of said conveyor, said upper roller of said pair of rollers being provided with a plurality of parallel and spaced-apart annular grooves on the periphery thereof, at least one laterally extending roller arranged above said conveyor, and a plurality of parallel and spaced-apart belts entrained over said plurality of grooves of said upper roller and said at least one roller, said plurality of belts, while contacting the upper surface of said dough piece, being movable in the advancing direction of the dough piece in synchronization with the movement of said conveyor; and a rolling up mechanism arranged downstream of said pair of rollers for rolling up the dough piece.

16. The apparatus of claim 15, characterized in that said conveyor is a belt conveyor.

17. The apparatus of claim 16, characterized in that said belt conveyor comprises at least two laterally extending rollers and a plurality of parallel and spaced-apart belts entrained over said at least two rollers.

18. The apparatus of claim 15, characterized in that said conveyor is a roller conveyor.

19. An apparatus for producing a dough roll comprising:
a dough piece conveying and stretching means comprising a pair of vertically juxtaposed rollers comprising an upper roller and a lower roller, said lower roller of said pair of rollers being provided with a plurality of parallel and spaced-apart annular grooves on the periphery thereof, at least one laterally extending roller arranged upstream of said pair of rollers, and a plurality of parallel and spaced-apart belts entrained over said plurality of grooves and said at least one roller to form a conveying path for a dough piece;
a dough piece holding means arranged above said conveying path and having a lower surface contacting the upper surface of said dough piece, said lower surface being movable in the advancing direction of the dough piece in synchronization with the movement of said conveying and stretching means; and
a rolling up mechanism arranged downstream of said pair of rollers for rolling up the dough piece.

20. The apparatus of claim 19, characterized in that said dough piece holding means is a belt system comprising at least two laterally extending rollers and a belt entrained over said at least two rollers.

21. The apparatus of claim 20, characterized in that said belt system comprises at least two rollers and a plurality of parallel and spaced-apart belts entrained over said at least two rollers.

22. The apparatus of claim 19, characterized in that said dough piece holding means is a roller system comprising a plurality of rollers juxtaposed transversely of the conveying path.

* * * * *